United States Patent
LaNasa, Sr.

[11] Patent Number: 5,991,955
[45] Date of Patent: Nov. 30, 1999

[54] APPARATUS FOR REMOVING BURS FROM INTERNAL WALL OF TUBULAR MEMBERS

[76] Inventor: Douglas M. LaNasa, Sr., P.O. Box 753, Channelview, Tex. 77530

[21] Appl. No.: 08/831,738

[22] Filed: Apr. 1, 1997

[51] Int. Cl.$^6$ ...................................................... B08B 9/00
[52] U.S. Cl. .................................. 15/104.095; 15/104.09; 15/104.05
[58] Field of Search .................. 15/104.05, 104.068, 15/104.09, 104.095, 104.13, 104.14

[56] References Cited

U.S. PATENT DOCUMENTS

| | | | |
|---|---|---|---|
| 1,058,091 | 4/1913 | Nirascou | 15/104.13 |
| 1,205,230 | 11/1916 | Lufkin | 15/104.13 |
| 1,367,314 | 2/1921 | Froussard | 15/104.13 |
| 2,005,359 | 6/1935 | Bagnoli et al. | 15/104.09 |
| 2,792,807 | 5/1957 | Cummings | 15/104.09 |
| 3,400,419 | 9/1968 | Fuller | 15/104.095 |
| 3,996,637 | 12/1976 | Shibata et al. | 15/104.14 |
| 4,726,137 | 2/1988 | Zurek et al. | 15/104.09 |

*Primary Examiner*—Terrence Till
*Attorney, Agent, or Firm*—Keaty & Keaty

[57] ABSTRACT

The invention relates to an assembly for removing burs from an internal wall of a pipe for the purposes of forming a smooth, protrusion free internal wall surface. The assembly has a drive motor with a rotating shaft which carries a cutting tool member on the free end of the shaft. A plurality of cutting blades extending from the exterior surface of the cutting tool member cut off the burs while the cutting tool member is advanced through the length of the pipe.

12 Claims, 2 Drawing Sheets

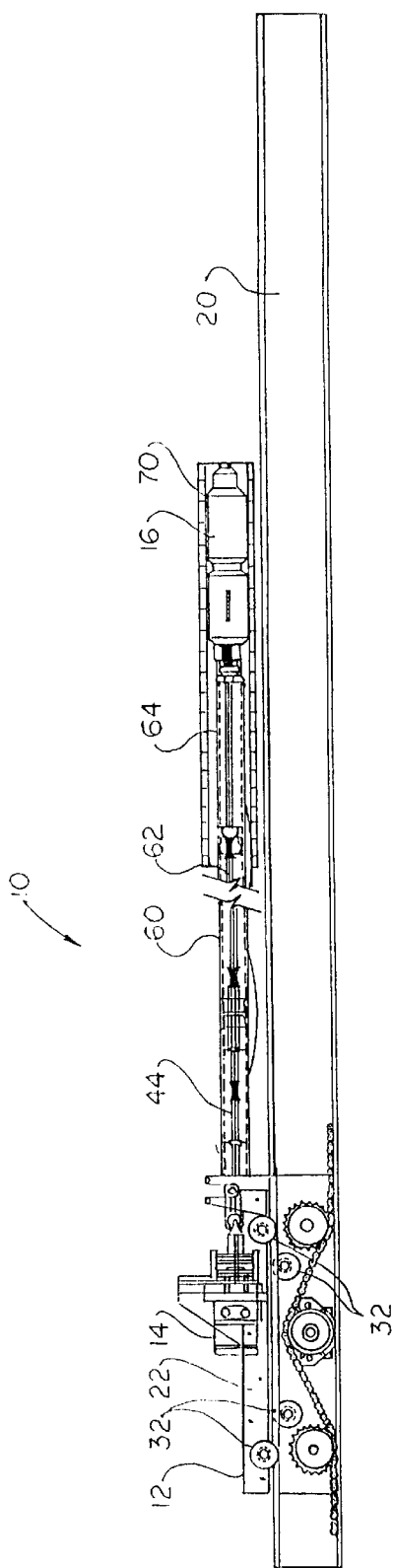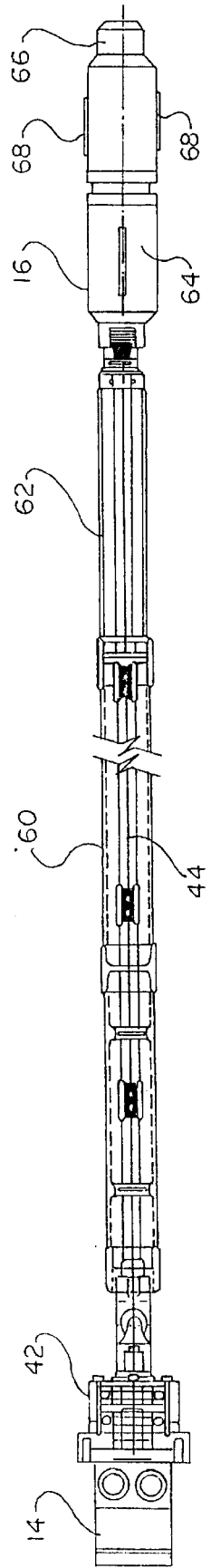

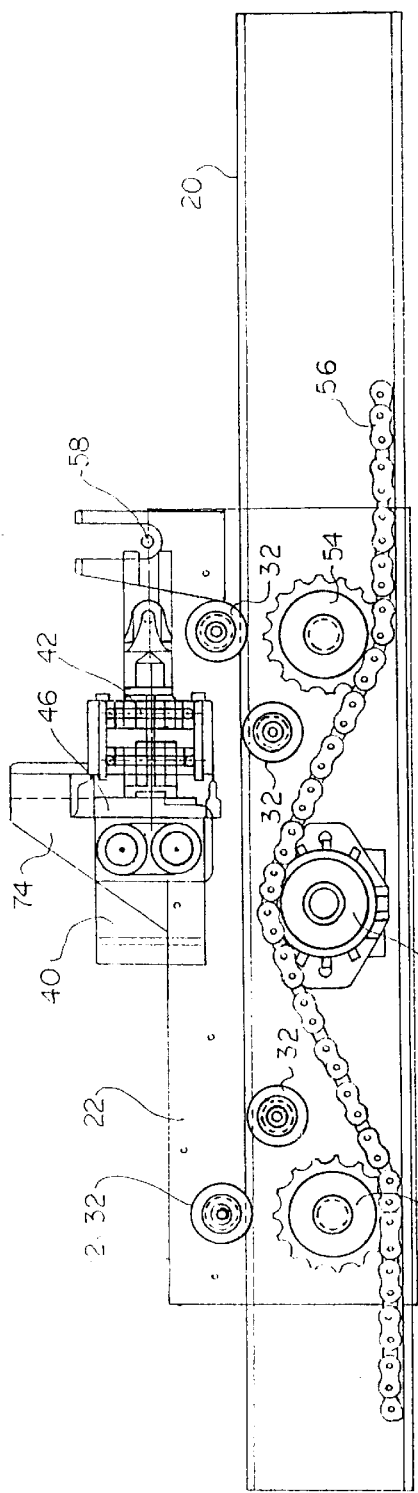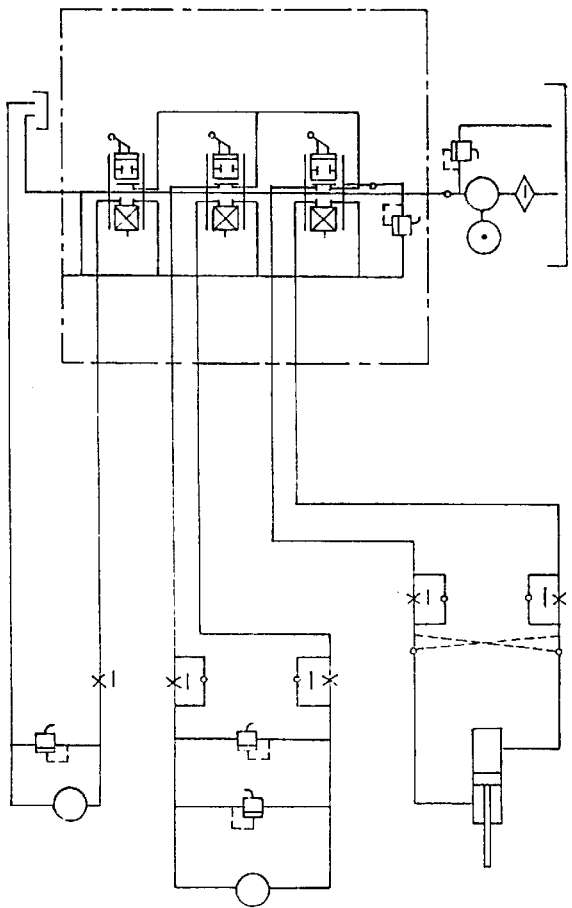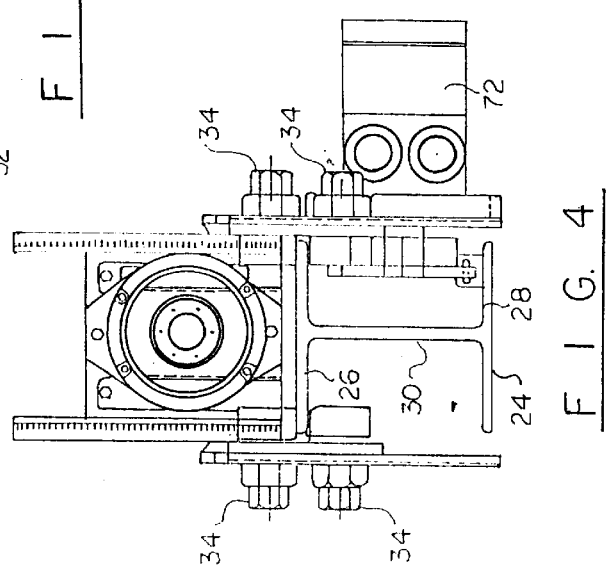

APPARATUS FOR REMOVING BURS FROM INTERNAL WALL OF TUBULAR MEMBERS

BACKGROUND OF THE INVENTION

The invention relates to a pipe treatment assembly, and more particularly to an apparatus for removing burs and other protrusions from an interior wall of pipes and of similar tubular members.

Conventionally, pipes manufactured by steel mills are formed by heating a solid block of metal, for example steel, and then pushing a circular rod through the block of metal to form a cylindrical opening. This process often results in the interior of the pipes being formed with imperfections, small burs and other protrusions that extend from the inside wall of the pipe. As a result, the interior surface of the pipe is not perfectly smooth when the pipe leaves a steel mill.

When the pipes are used in the oil or gas production, it is a highly desirable feature to have the interior surfaces that are perfectly smooth to prevent corrosion of metal in the high acid environment of drilling and production operations, as well as allow the flow of fluids at a steady rate. When the interior surface of the pipe is not perfectly smooth, the resulting friction slows the flow of fluid, requires more power to pump the fluid and builds up pressure inside the pipe.

One of the solutions utilized in the oil field is to cover the interior wall of the pipe with a friction-resistant coating, for example epoxy, in an effort to create a uniformly smooth surface. However, if the inside surface has many protrusions, or irregularities the surface coating will have a part of the surface with a thicker coat than others. Even further, if the protrusion is large enough, it may end up not being coated with the protective layer at all, and will expose that portion of the pipe to the adverse conditions of a well bore environment.

The present invention contemplates elimination of drawbacks associated with the prior art and provision of an apparatus for removing burs from interior of tubular members, such as pipes, in order to form a protrusion free, smooth surface.

SUMMARY OF THE INVENTION

It is, therefore, an object of the present invention to provide an apparatus for removing burs and similar protrusions from an interior of a tubular member.

It is another object of the present invention to provide an apparatus for cutting protrusions existing on an interior surface of a pipe to create a smooth interior surface.

It is another object of the present invention to provide an apparatus for removing burs from an interior surface of a pipe which is easy to use and inexpensive to manufacture.

These and other objects of the present invention are achieved through a provision of an apparatus for removing burs from an internal wall of a tubular object, such as a pipe, which comprises a support member, a carriage assembly mounted on and movable along the support member, and a drive motor with a rotating shaft for moving a cutting tool member along the length of the pipe. The rotating shaft extends above the support member, in a generally parallel relationship to the top surface of the support member, with means provided for adjusting a vertical position of the rotating shaft to accommodate different diameters of pipes.

The cutting tool member has a plurality of detachable cutting blades secured to the tool body and extending outwardly therefrom. The cutting tool member, being securely attached to the rotating shaft, moves along a horizontal plane, advancing or reversing in relationship to the longitudinal axis of the pipe during operation. The cutting blades come into contact with the burs protruding from the internal wall of the pipe, severing the burs and producing a substantially smooth, protrusion-free inner wall surface.

BRIEF DESCRIPTION OF THE DRAWINGS

Reference will now be made to the drawings, wherein like parts are designated by like numerals, and wherein FIG. 1 is a schematic view of the assembly in accordance with the present invention.

FIG. 2 is a detail view of a drive motor assembly and a cutting tool member carried by a shaft of the drive motor assembly.

FIG. 3 is a detail view of the carriage assembly of the apparatus in accordance with the present invention.

FIG. 4 is an end view of the carriage assembly shown in FIG. 3.

FIG. 5 is a schematic view of a hydraulic control system of the apparatus of the present invention.

DETAIL DESCRIPTION OF THE PREFERRED EMBODIMENT

Turning now to the drawings in more detail, numeral 10 designates the bur removing assembly in accordance with the present invention. The apparatus 10 comprises a carriage assembly 12, a drive motor assembly 14 and a cutting tool member 16. The carriage assembly 12 is mounted on a support member 20 that forms a guiding surface for moving of a sliding carriage 22 thereon.

The support member 20 can be in the form of an I-beam 24 (see FIG. 4) that has an upper horizontal portion 26, a lower horizontal portion 28 and a vertical connecting portion 30. A plurality of rollers 32 slide along the upper horizontal portion 26 when the SLIDING carriage 22 moves along the support member 20. The rollers 32 can be flanged load rollers, or similar rollers, and can be eight or more in number.

One half of the rollers 32 rides on an upper surface of the portion 26, while another half of the rollers rides along the bottom surface of the portion 26. The rollers 32 are secured in relationship to the portion 26 by suitable pins, or bolts 34 (see FIG. 4).

Mounted on the sliding carriage 22 is a drive motor assembly 14 that comprises a hydraulic drive motor 40, a thrust bearing assembly 42 and an elongated drive shaft 44 (FIGS. 1, 2) operationally connected to the motor 40 through the thrust bearing assembly 42.

A motor mount and bearing housing 46 is secured between the drive motor 40 and the thrust bearing assembly 42 in a manner well known to those skilled in the art. The drive motor 40 can be a hydraulic motor, or other suitable type of power source suitable for moving the drive shaft 44 and the cutting tool member 16.

An auxiliary motor 72 is provided for severing movement of the sliding carriage 22 after the cutting tool member 16 has removed the burs from a pipe inside wall. To facilitate this process, a drive sprocket 50 is operationally connected to the motor to facilitate movement of the carriage 22 along the support. A pair of idle sprockets 52 and 54 are mounted on both sides of the drive sprocket 50, as better shown in FIG. 3, and a roller chain 56 anchored to the bottom horizontal portion 24 of the support member 20 is raised to engage the teeth of the sprocket 50, transferring rotational movement of the drive force of the motor 72 to the carriage 22.

The drive motor rotating shaft 44 is connected to the bearing assembly 42 through the use of a conventional universal coupling 58. The drive shaft 44 is mounted in a cylindrical housing 60 in order to ensure safety of the operation. A plurality of ball bearings (not shown) support the shaft 44 inside the housing 60. As shown in FIGS. 1 and 2, the housing 60 surrounds the rotating shaft 44. The diameter of the housing 60 is such as to allow the housing 60 to be inserted into the interior of a pipe 70 and move the cutting tool member 16 through the pipe interior. The outside diameter of the housing is slightly smaller than the internal diameter of the pipe 70 to allow such movement.

A free end 62 of the shaft 44 carries a tool adaptor 64 which is secured to the cutting tool member 16 on its respective free end.

Turning now to FIG. 2, the cutting tool member 16 is seen to comprise an elongated tubular body 64 having a reduced diameter nose portion 66. Mounted on the elongated body 64 and extending outwardly therefrom are a plurality of cutting blades 68 which are spaced about the outer circumference of the body 64 and can be three or more in number. The cutting blades 68 are spring loaded, with the springs housed within the body 64 in order to move the blades 68 in a close contact with an interior of a pipe 70 (FIG. 1) within which the cutting tool 16 moves during operation. The cutter blades 68 have set screws 69 to allow replacement of the blades 68 when they become worn.

The blades 68 are mounted on compression springs that force the blades outwardly from the body 64, into a close contact with the interior of the pipe 70. Rotation of the cutting tool member 16 is accomplished through another hydraulic motor that provides approximately 300 rpm and allows to increase or decrease the speed with which the tool 16 rotates. A traversing motor 72 is operationally connected to the sprocket shaft 50 and allows reverse movement of the cutting tool 16, withdrawing the cutting tool 16 from the pipe 70 while the pipe 70 remains stationary during operation.

The position of the drive shaft 44, and consequently of the cutting tool member 16 can be adjusted in relation to the plane of the support member 20. A height adjusting member 74 (FIG. 3) allows to move the drive shaft 44 up and down, to a limited degree, so as to better accommodate the various diameter pipes that are treated with the apparatus 10 of the present invention.

After the cutting tool member 16 has traveled through the entire length of the pipe 70, it is withdrawn by actuating the reverse auxiliary 72, and any cuttings or foreign particles that have been generated during the operation of the apparatus 10 are removed from the inside of the pipe 70 by a forced air flow or other similar means. Alternatively, the cuttings can be removed by liquid, depending on the availability of suitable material. The resultant pipe is ready for epoxy application. The epoxy coating will be protrusion-free, with a uniform thickness, as required by the oil and gas drilling production operations.

A safety by-pass system allows to stop advancement and rotation of the cutting tool member 16 through the pipe 70 if it encounters a particular obstruction and becomes stuck. The safety by-pass feature prevents damage to the apparatus 10 and ensures safety of the operator.

The device of the present invention can be also used for removing scale or rust that settled on the inside of the pipe.

Prior devices that have been used for this purpose tended to bend the protrusions down, while moving through the interior of the pipe, with the burs returning to their original position after the cleaning tools had been withdrawn. Since the burs are usually small pieces of metal that has resiliency and memory, the burs tended to return to their original position and cause the epoxy coating to be uneven.

The present invention, by shaving, or cutting off the burs and slivers on the interior of the pipe solves this problem in an efficient and economical manner.

Many changes and modifications can be made in the design of the present invention without departing from the spirit thereof. We, therefore, pray that our rights to the present invention be limited only by the scope of the appended claims.

I claim:

1. An apparatus for removing burs from an internal wall of a tubular object, the apparatus comprising:

a support member having an upper plate, a lower plate and a connecting portion extending between said upper plate and said lower plate;

a carriage assembly mounted on and movable along said support member;

a drive means carried by said carriage assembly, said drive means comprising an elongated rotating shaft operationally connected to a drive motor; and a cutting tool member carried by a free end of said rotating shaft, said cutting tool member comprising a plurality of detachable blades for cutting burs from the internal wall of a tubular object while the cutting tool member is being moved in relation to a longitudinal axis of the tubular object.

2. The apparatus of claim 1, wherein said carriage assembly comprises a plurality of rollers engaging said upper plate to facilitate movement of said carriage assembly along said support member.

3. The apparatus of claim 1, wherein said rotating shaft extends above said upper plate in axial alignment with the longitudinal axis of the tubular object during operation.

4. An apparatus for removing burs from an internal wall of a tubular object, the apparatus comprising:

a support member;

a carriage assembly mounted on and movable along said support member;

a drive means carried by said carriage assembly, said drive means comprising an elongated rotating shaft operationally connected to a drive motor;

a cutting tool member carried by a free end of said rotating shaft, said cutting tool member comprising a plurality of detachable blades for cutting burs from the internal wall of a tubular object while the cutting tool member is being moved in relation to a longitudinal axis of the tubular object; and a means for reversing movement of the rotating shaft within said tubular object.

5. The apparatus of claim 4, wherein said means for reversing movement comprises an auxiliary motor mounted on said support member and operationally connected to said carriage assembly.

6. An apparatus for removing burs from an internal wall of a tubular object, the apparatus comprising:

a support member;

a carriage assembly mounted on and movable along said support member;

a drive means carried by said carriage assembly, said drive means comprising an elongated rotating shaft operationally connected to a drive motor;

a cutting tool member carried by a free end of said rotating shaft, said cutting tool member comprising a plurality of detachable blades for cutting burs from the internal wall of a tubular object while the cutting tool member is being moved in relation to a longitudinal axis of the tubular object; and wherein said rotating shaft is mounted in a housing, and wherein said housing has an outside diameter at least slightly smaller than an internal diameter of said tubular object.

7. An apparatus for removing burs from an internal wall of a tubular object, the apparatus comprising:

a support member;

a carriage assembly mounted on and movable along said support member;

a drive means carried by said carriage assembly, said drive means comprising an elongated rotating shaft operationally connected to a drive motor;

a cutting tool member carried by a free end of said rotating shaft, said cutting tool member comprising a plurality of detachable blades for cutting burs from the internal wall of a tubular object while the cutting tool member is being moved in relation to a longitudinal axis of the tubular object; and a means carried by said carriage assembly for adjusting a vertical position of said rotating shaft in relation to said support member.

8. An apparatus for removing burs from an internal wall of a pipe, the apparatus comprising:

a support member having an upper plate, a lower plate and a connecting portion extending between the upper plate and the lower plate;

a carriage assembly mounted on and movable along the upper plate;

a drive means carried by the carriage assembly, the drive means comprising an elongated rotating shaft operationally connected to a drive motor, said elongated shaft being movable above said upper plate in an axial alignment with a longitudinal axis of the tubular member during operation;

a cutting tool member carried by a free end of the rotating shaft, said cutting tool member comprising a plurality of detachable blades mounted on an exterior of a cutting tool body for cutting burs from the internal wall of the pipe while the cutting tool member is being moved in a relation to the longitudinal axis of the pipe; and a means mounted on the carriage assembly for adjusting a vertical position of the rotating shaft in relation to the support member.

9. The apparatus of claim 8, wherein said carriage assembly comprises a plurality of rollers engaging said upper plate to facilitate movement of the carriage assembly along the upper plate.

10. The apparatus of claim 9, further comprising a means for reversing movement of the rotating shaft within said pipe, said means for reversing movement comprising an auxiliary motor mounted on the support member and operationally connected to the carriage assembly.

11. The apparatus of claim 8, wherein said cutting tool member comprises a generally cylindrical body having an outside diameter at least slightly smaller than a diameter of the internal opening of the pipe.

12. The apparatus of claim 8, further comprising a thrust bearing assembly mounted between said drive motor and said elongated shaft.

* * * * *